Dec. 12, 1972  D. R. BRICKNER ET AL  3,705,980
CONTROLLED MAGNITUDE REPEATER FOR SYNCHRO AND RESOLVER SIGNALS
Filed Jan. 2, 1970  2 Sheets-Sheet 1

INVENTORS
DAVID R. BRICKNER
SIDNEY T. SCHELL
BY

*H.P. Terry*
ATTORNEY

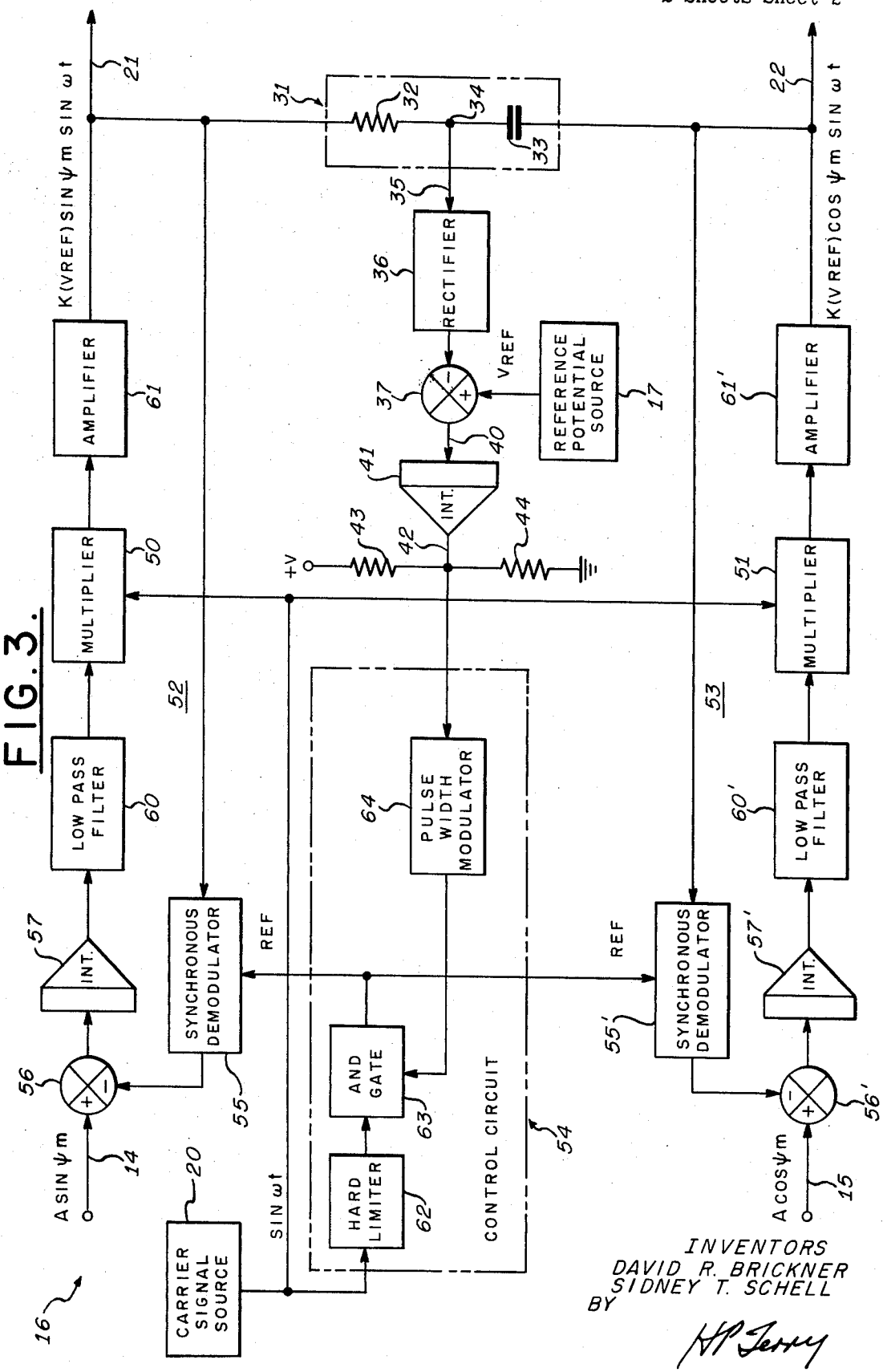

United States Patent Office 3,705,980
Patented Dec. 12, 1972

3,705,980
CONTROLLED MAGNITUDE REPEATER FOR SYNCHRO AND RESOLVER SIGNALS
David R. Brickner and Sidney T. Schell, Phoenix, Ariz., assignors to Sperry Rand Corporation
Filed Jan. 2, 1970, Ser. No. 55
Int. Cl. G06g 7/22
U.S. Cl. 235—186
33 Claims

ABSTRACT OF THE DISCLOSURE

This application describes a controlled magnitude repeater for synchro and resolver signals having undesired variations in magnitude. The repeater comprises adjusting means responsive to the angle signals for providing corresponding repeated angle signals. Combining means are included for combining the repeated angle signals providing a signal whose magnitude is independent of the angle and dependent on the undesired magnitude variations. A reference signal is provided for comparison with the combined signal thereby providing an error signal. The error signal is fed back to the adjusting means to adjust the repeated angle signals thereby rendering them independent of the undesired magnitude variations.

BACKGROUND OF THE INVENTION

(1) Field of the invention

The invention pertains to repeater devices for signals of the synchro and resolver type particularly suitable for use in flux valve compass systems.

(2) Description of the prior art

Signals of the synchro and resolver type, which conventionally represent functions of angles, often experience undesired variations in magnitude. For example, the signals from the stator windings of a synchro device will vary in magnitude in accordance with the magnitude variations experienced by the rotor signal although the rotor of the device may be stationary with respect to the stator.

Conventional flux valve devices provide synchro type signals that vary in magnitude in accordance with variations in the strength of the magnetic field whose direction the flux valve may be sensing although the orientation of the flux valve with respect to the field may remain constant. For example, in gyromagnetic compass systems of the type shown in U.S. Pat. No. 2,357,319 entitled "Flux Valve Magnetic Compass," issued Sept. 5, 1944 to Esval et al. and assigned to the present assignee, difficulties may be experienced particularly at high latitudes due to the decreasing field strength of the horizontal component of the earth's magnetic field compared to lower latitudes. The flux valve output signals may vary in magnitude although the flux valve orientation with respect to the direction of the magnetic meridian may remain constant. System servo error signals derived from the flux valve output may thus decrease in magnitude with increasing latitude resulting in an undesirable reduction of the system sensitivity compared to operation in lower latitudes.

Additionally, in conventional flux valve compass systems, it is usually desirable to repeat the flux valve angle signals for transmission to remotely located slaved heading indicators. Prior art repeaters conventionally include a synchro control transformer, the stator windings of which are usually connected to the windings of the flux valve. The resulting error signal provided by the rotor of the control transformer is amplified to drive a motor. The motor, in turn, drives a shaft coupled to the rotor of the control transformer nulling the error signal in a well known manner. When the servo loop is stabilized, the shaft is aligned with the direction of the magnetic meridian. Tachometer feedback is usually included to provide damping. A synchro transmitter coupled to the shaft provides the repeated signals for the remotely located slaved heading indicators. As is well known, the signals provided by the flux valve are at twice the frequency of the system carrier and vary in magnitude with variations in the earth's magnetic field strength. The repeated signals provided by the synchro transmitter to the remotely located slaved heading indicators are at the system carrier frequency and are independent of variations in magnetic field strength by reason of the independent source of carrier signal usually provided to the synchro transmitter for the purpose of generating the repeated signals. Although the repeated signals may conveniently be at the system carrier frequency and may be independent of variations in magnetic field strength, prior art repeaters of the type described above utilize electromechanical components and associated coupling gears which have attendant wear and maintenance problems as well as being heavy, bulky and expensive to manufacture.

SUMMARY OF THE INVENTION

It is desirable in flux valve compass systems, for use particularly in aircraft, to replace electromechanical components with functionally similar electronic components which are lighter, less bulky and less expensive as well as more reliable and maintenance free compared to the corresponding electromechanical counterparts. The present invention comprises an electronic repeater for signals representing functions of angles particularly of the synchro and resolver type such as might be provided by a flux valve. The invention provides repeated angle signals that are independent of undesired magnitude variations in the input angle signals and may additionally be provided on any convenient carrier.

The invention comprises adjusting means responsive to the angle signals from, for example, a flux valve for providing corresponding repeated angle signals. Combining means are included for combining the repeated angle signals providing a signal whose magnitude is independent of the angle and dependent on the undesired magnitude variations. A reference signal is provided for comparison with the combined signal thereby providing an error signal. The error signal is fed back to the adjusting means to adjust the repeated angle signals thereby rendering them independent of the undesired magnitude variations.

Thus, an electronic repeater is provided, in accordance with the present invention, that generates repeated angle signals independent of undesired magnitude variations of the input signals and which may be on any convenient carrier, in a manner to be explained hereinafter.

BRIEF DESCRIPTION OF THE DRAWINGS

FIG. 3 is a block schematic diagram illustrating another embodiment of the repeater of the present invention.

DESCRIPTION OF THE PREFERRED EMBODIMENT

Figure 1:
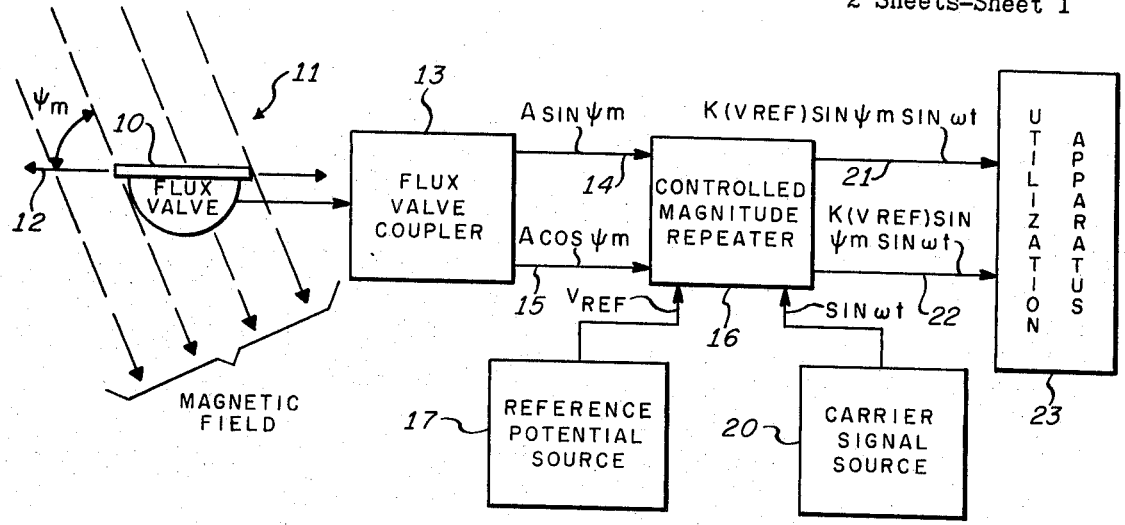
FIG. 1 is a system block diagram illustrating components of a flux valve compass system of a type particularly suitable to utilize the repeater of the present invention.

Referring to FIG. 1, portions of a flux valve magnetic compass system, which may be of the type described in said Pat. No. 2,357,319, are illustrated. The system is of a type particularly suitable to utilize the repeater of the present invention. A flux valve 10, responsive to a magnetic field 11 in which it is immersed, provides signals, which hereinafter will be referred to as angle signals, representative of functions of the angle $\psi_m$ between the direction of the field 11 and a reference direction 12 with respect to the flux valve 10. The field 11 may, for example, be the horizontal component of the earth's magnetic field which varies in magnitude with latitude. The angle signals from the flux valve 10 are conventionally of the synchro type which usually comprise three modulated carrier signals whose magnitudes, relative to each other, are representative of trigonometric functions of the angle $\psi_m$. The carrier signals from the flux valve 10 are usually at twice the flux valve primary excitation frequency, for reasons well understood in the art. It may be appreciated that when the field strength of the magnetic field 11 varies, the angle signals from the flux valve 10 may vary in magnitude in a corresponding manner, which variations may be undesired for the reasons discussed above.

The angle signals from the flux valve 10 are provided to a flux valve coupler 13 which may, for example, provide two D.C. signals on leads 14 and 15 representative of the sine and cosine of the angle $\psi_m$, respectively, as indicated by the legend. The conventional three-wire synchro signals from the flux valve 10 may be converted by the flux valve coupler 13, to the two D.C. resolver type signals on the leads 14 and 15, by, for example, converting the three-wire synchro flux valve signals to two-wire A.C. resolver signals by means of a Scott T transformer, not shown, in a manner well understood in the synchro art. The A.C. sine and cosine signals provided by the Scott T transformer may be converted to the D.C. sine and cosine signals on the leads 14 and 15, respectively, by means of demodulators, not shown, in a conventional manner. Alternatively, in a preferred mode of utilizing the present invention, the flux valve coupler 13 may be a circuit of the type disclosed in U.S. pending patent application S.N. 787,143 entitled "Compass System and Components Therefor Having Automatic Field Cancellation," filed Dec. 26, 1968 in the names of Baker et al. and assigned to the present assignee. The flux valve coupler 13 provides the two D.C. angle signals on the leads 14 and 15 designated as $A \sin \psi_m$ and $A \cos \psi_m$, as indicated by the legend, where A is a variable related to the strength of the magnetic field 11.

The angle signals on the leads 14 and 15 are applied as inputs to a controlled magnitude repeater 16 implemented in accordance with the present invention. A D.C. reference potential, $V_{ref}$, from a reference potential source 17 and a carrier signal, $\sin \omega t$, from a carrier signal source 20 are applied as inputs to the repeater 16. The repeater 16, in turn, provides the repeated angle signals designated as $K(V_{ref}) \sin \psi_m \sin \omega t$ and $K(V_{ref}) \cos \psi_m \sin \omega t$ on leads 21 and 22, respectively, where K is a constant independent of the strength of the magnetic field 11, in a manner to be explained with respect to FIG. 2.

The repeated angle signals on the leads 21 and 22 are applied as inputs to a compass utilization apparatus 23. The utilization apparatus 23 may include a directional gyro, its slaving amplifier as well as one or more heading indicators and slaved heading indicators as is generally known in the compass art and therefore not shown in detail.

Figure 2:
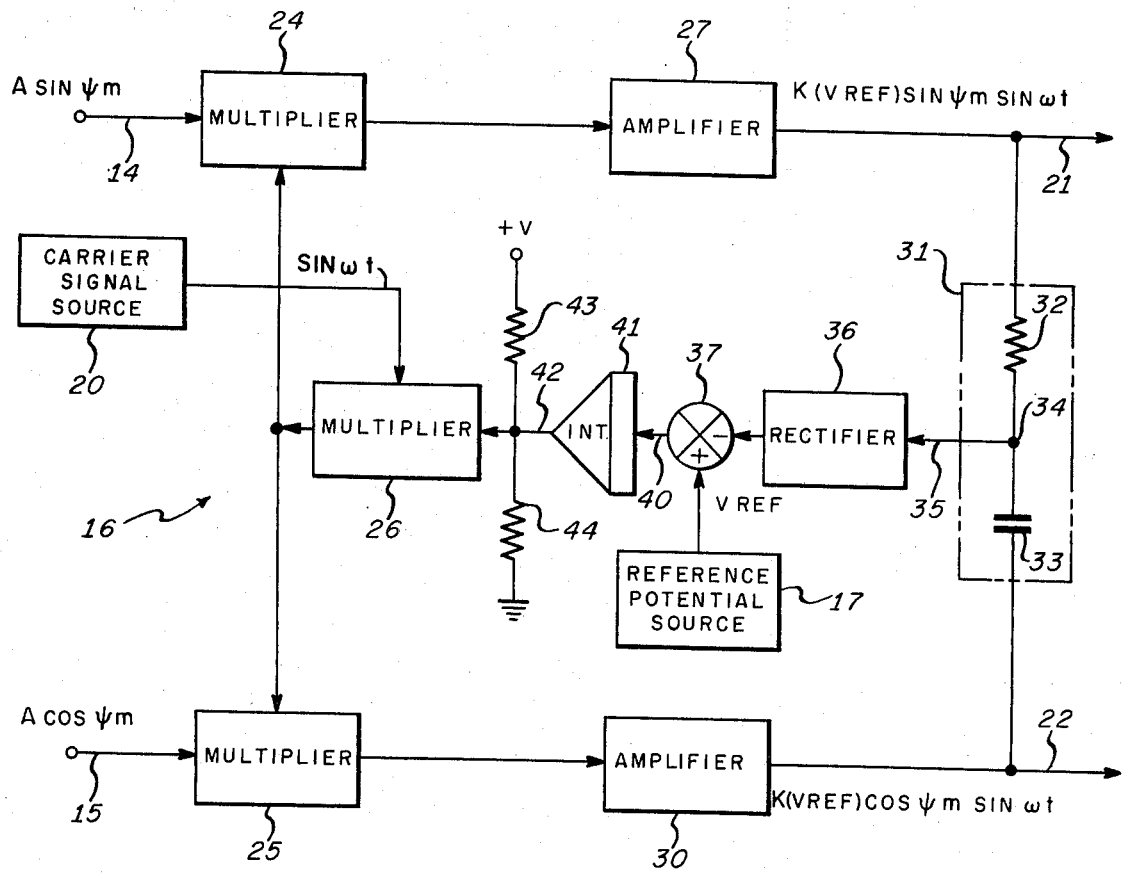
FIG. 2 is a block schematic diagram illustrating a preferred embodiment of the repeater of the present invention.

Referring now to FIG. 2, a preferred embodiment of the controlled magnitude repeater 16, implemented in accordance with the present invention, is illustrated. The sine and cosine signals on the leads 14 and 15 are applied as inputs to multipliers 24 and 25, respectively. The multipliers 24 and 25 also receive the carrier signal from the carrier signal source 20, via a multiplier 26, for reasons to be discussed. The carrier signal may be designated, conventionally, as $\sin \omega t$ as indicated by the legend. The multipliers 24 and 25 modulate the carrier signal in accordance with the signals on the leads 14 and 15 thereby providing signals proportional to the products $\sin \psi_m \sin \omega t$ and $\cos \psi_m \sin \omega t$, respectively.

The signals from the multipliers 24 and 25 are amplified by amplifiers 27 and 30 which may be of a conventional synchro amplifier type. The repeated angle signals on the leads 21 and 22 from the amplifiers 27 and 30 may be designated as $K(V_{ref}) \sin \psi_m \sin \omega t$ and $$K(V_{ref}) \cos \psi_m \sin \omega t$$

respectively, as indicated by the legend, for reasons to be discussed.

The repeated angle signals 21 and 22 are applied to a combining circuit 31 which may comprise a resistor 32 and a capacitor 33. The resistor 32 and the capacitor 33 may be connected in series circuit with a junction 34 therebetween. The signals on the leads 21 and 22 may be applied to the terminals of the resistor 32 and the capacitor 33 opposite the junction 34 respectively. The junction 34 may provide a combined signal on a lead 35 in a manner and for reasons to be explained.

The combined signal on the lead 35 is applied as an input to a conventional rectifier 36 which provides a D.C. rectified combined signal whose magnitude is proportional to the magnitude of the combined signal.

The rectified combined signal is applied as an input to a conventional subtractor circuit 37 to which the D.C. reference potential, $V_{ref}$, from the reference potential source 17 is also applied. The subtractor circuit 37 provides an error signal on a lead 40 representative of the difference between the rectified combined signal and the reference potential.

The error signal on the lead 40 is applied as an input to a conventional integrator 41 which in turn provides an integrated error signal on a lead 42 in a manner to be described. The integrated error signal on the lead 42 is biased by a $+V$ voltage, as indicated by the legend, by means of a voltage divider comprised of series connected resistors 43 and 44. The $+V$ voltage is applied to one terminal of the resistor 43, the other terminal of which is connected to the output lead 42 of the integrator 41. One terminal of the resistor 44 is connected to the lead 42 and the other terminal thereof is connected to ground potential. The resistance values of the resistors 43 and 44 and the magnitude of the $+V$ voltage are suitably chosen so that the integrated error signal on the lead 42 cannot become negative for reasons to be clarified hereinafter. The rectifier 36, the subtractor 37 and the integrator 41 comprise a feedback circuit coupled between the combining circuit 31 and the multiplier 26.

The integrated error signal on the lead 42 is applied as an input to the multiplier 26 which, as previously described, is also responsive to the carrier signal, $\sin \omega t$, from the carrier signal source 20. The multipliers 24, 25 and 26 comprise an adjusting circuit for adjusting the signals provided by the multipliers 24 and 25 in accordance with the integrated error signal 42, in a manner to be explained.

In operation, referring to FIGS. 1 and 2 and considering the flux valve reference axis 12 oriented at a particular angle $\psi_m$ with respect to the magnetic field 11, the magnitudes of the D.C. signals on the leads 14 and 15, representative of the sine and the cosine of the angle $\psi_m$, respectively, will have a constant ratio with respect to each other dependent on the particular angle $\psi_m$. The magnitudes of the signals on the leads 14 and 15 will, however, vary in accordance with variations in the strength of the magnetic field 11 as indicated by the variable A. The signals on the leads 14 and 15 modulate the carrier signal, $\sin \omega t$ in the multipliers 24 and 25 respectively. The amplified modulated carrier signals on the leads 21 and 22, which comprise the repeated angle signals from the repeater 16, are applied to the combining circuit 31 as previously described. The signal on the lead 21 may be designated as $K(V_{ref}) \sin \psi_m \sin \omega t$ and the signal on the lead 22 may be designated as $K(V_{ref}) \cos \psi_m \sin \omega t$ as previously explained. The combining circuit 31 may be considered as a summing circuit having the summing junction 34 whereat the sum of the signals on the leads 21 and 22 is provided. Since the capacitor 33 imparts a 90° phase shift to the signal on the lead 22, the circuit 31 provides the combined signal on the lead 35 which may be designated as $$K(V_{ref}) \sin \psi_m \sin \omega t + K(V_{ref}) \cos \psi_m \cos \omega t$$

This expression may be written equivalently as $$K(V_{ref})[\sin \omega t \sin \psi_m + \cos \omega t \cos \psi_m]$$

By a well known trigonometric identity, the combined signal on the lead 35 may equivalently be designated as $K(V_{ref})[\cos (\omega t - \psi_m)]$. It may therefore be appreciated that the combined signal is a carrier signal of frequency proportional to $\omega$ whose phase angle is dependent upon $\psi_m$ and whose magnitude is proportional to $K(V_{ref})$, where K is a constant related to the parameters associated with the components of the repeater 16. It may thus be appreciated that variations in the angle $\psi_m$ result in variations in the phase angle of the combined signal on the lead 35 but not in the magnitude thereof. Variations in the field strength of the magnetic field 11, however, do effect the magnitude of the combined signal by reason of the effect of the variations on the magnitudes of the signals on the leads 21 and 22 from which the combined signal is derived.

The combined signal on the lead 35 is converted to D.C. by the rectifier 36. The D.C. combined signal and the D.C. reference potential, $V_{ref}$, are subtracted from one another in the subtractor 37 providing the D.C. error signal on the lead 40. The error signal on the lead 40 is, in turn, integrated by the integrator 41 and the integrated error signal on the lead 42 is utilized as the multiplying signal for the carrier, $\sin \omega t$ in the multiplier 26. The modulated carrier signal is, in turn, utilized in the multipliers 24 and 25 as the carrier for the D.C. angle signals on the leads 14 and 15, respectively.

When the repeater 16 is in a quiescent state, the value of the constant K is such that the rectified combined signal is equal in magnitude to the reference potential, $V_{ref}$. The error signal on the lead 40 is then zero and the integrator 41 provides the integrated error signal, which is stored therein, as the multiplier for the carrier $\sin \omega t$. Should the angle $\psi_m$ change, the magnitude of the combined signal on the lead 35 would remain unaltered, as previously explained, thus maintaining the quiescent condition of the repeater 16. Should, however, the field strength of the magnetic field 11 increase, for example, with an attendant increase in the magnitudes of the signals on the leads 14, 15, 21 and 22, the magnitude of the rectified combined signal on the lead 35 would, in turn, increase thus providing a negative error signal on the lead 40 with respect to $V_{ref}$. The negative error signal would subtract from the integrated error signal on the lead 42, stored in the integrator 41, thus decreasing the amplitude of the carrier $\sin \omega t$ provided by the multiplier 26. The signals on the leads 21 and 22 would consequently decrease in magnitude until the error signal on the lead 40 again became zero under which condition the magnitudes of the repeated angle signals on the leads 21 and 22 would be the same as they were before the field strength of the magnetic field 11 increased.

In a similar manner, should the field strength of the magnetic field 11 decrease, a positive error signal on the lead 40 would result which would add to the integrated error signal on the lead 42 thus increasing the magnitude of the repeated angle signals on the leads 21 and 22 until quiescence would again maintain.

It is therefore appreciated that the repeated angle signals on the leads 21 and 22 are maintained at a uniform value related to the constant K with respect to the reference potential, $V_{ref}$, by reason of the feedback characteristics of the repeater 16 for a constant angle $\psi_m$.

As previously described, the integrated error signal on the lead 42 is biased to remain above ground potential by the voltage divider comprised of the resistors 43 and 44. Should the integrated error signal become negative, regenerative feedback would occur around the feedback loop of the repeater 16 resulting in negative saturation of the integrator 41, into which condition the repeater 16 would become locked.

It may be appreciated that the resistor 32 and the capacitor 33 of the combining circuit 31 may be interchanged with respect to each other to provide the same result as obtained by the arrangement illustrated. Although the trigonometric form of the combined signal on the lead 35 will be altered, the independence of the amplitude thereof with respect to the angle $\psi_m$ will be preserved.

It may further be appreciated that although the resistance-capacitance network 31 is preferred in the repeater of the present invention, other networks such as resistance-inductance networks or active filter networks may be utilized to the same effect.

It may now be appreciated that although the flux valve 10 may provide signals at twice the frequency of the system carrier signal, the repeater 16 may provide angle signals on any convenient carrier by virtue of the carrier signal source 20.

An alternative embodiment of the repeater 16 may be realized by utilizing gain controlled amplifiers in place of the amplifiers 27 and 30 and utilizing the integrated error signal on the lead 42 to regulate the gain thereof. A constant amplitude carrier $\sin \psi t$ may then be applied to the multipliers 24 and 25 eliminating the requirement for the multiplier 26. This arrangement suffers from the disadvantage that differences in gain control between the amplifiers 27 and 30 may result in undesirable system errors. The preferred embodiment of the invention described above does not suffer from this limitation by reason of the common-mode amplitude control provided by the multiplier 26.

Referring now to FIG. 3, in which like reference numerals indicate like components with respect to FIG. 2, another embodiment of the repeater 16 is illustrated. The operation of the embodiment of FIG. 3 is generally similar to that of the embodiment described with respect to FIG. 2. In the circuit of FIG. 2, the carrier signal, whose amplitude is dependent upon the integrated error signal on the lead 42, is modulated by the sine and cosine signals in the multipliers 24 and 25, respectively. In the embodiment of FIG. 3, a constant amplitude carrier signal is modulated by signals representative of the sine and cosine signals by multipliers 50 and 51, respectively, thus providing the repeated angle signals, respectively, on leads 21 and 22. The multipliers 50 and 51 are part of respective gain controlling loops 52 and 53 which are responsive to the sine and cosine signals on the leads 14 and 15, respectively. The respective gains of the loops 52 and 53 are adjusted by a control circuit 54, in accordance with the integrated error signal on the lead 42, to provide the repeated angle signals on the leads 21 and 22 rendered independent of undesired magnitude variations in a manner to be explained.

The gain controlling loop 52 is comprised of a synchronous demodulator 55, a subtractor 56, an integrator 57, a lowpass filter 60, the multiplier 50 and an amplifier 61. The repeated angle signal provided by the loop 52 on the lead 21 is demodulated in the synchronous demodulator 55. The D.C. signal provided by the demodulator 55 is subtracted from the sine signal on the lead 14 in the subtractor 56 and the difference signal provided thereby is integrated in the integrator 57. The integrated difference signal is applied as an input to the multiplier 50 via the lowpass filter 60 wherein unwanted high frequency components are removed. The multiplier 50 modulates the carrier signal by the integrated difference signal from the integrator 57, thus providing the repeated sine signal on the lead 21 via the conventional amplifier 61. The repeated sine signal on the lead 21 is demodulated in the demodulator 55 thus providing the D.C. feedback signal to the subtractor 56 as previously explained.

The gain controlling loop 52 provides a follow-up function for the sine signal on the lead 14. When the amplitude of the sine signal changes either because of changes in the angle $\psi_m$ or because of undesired magnitude variations, the difference signal from the subtractor 56 provides the loop error signal, via the integrator 57, to adjust the amplitude of the repeated sine signal on the lead 21, via the multiplier 50, until the difference signal provided by the subtractor 56 is reduced to zero. In this manner, the amplitude of the repeated sine signal on the lead 21 is caused to follow variations in the amplitude of the sine signal on the lead 14.

In a manner similar to that described with respect to the loop 52, the gain controlling loop 53 provides a follow-up function for the repeated cosine signal on the lead 22 respect to the cosine signal on the lead 15.

The repeated angle signals on the leads 21 and 22 are applied to the combining circuit 31 to provide the combined signal on the lead 35 in a manner identical to that described with respect to FIG. 2.

The combined signal on the lead 35 is applied to the feedback network comprised of the rectifier 36, the subtractor 37 and the integrator 41, to provide the integrated error signal on the lead 42 in the manner previously described with respect to FIG. 2.

The voltage divider comprised of the resistors 43 and 44 is included for the reasons given with respect to FIG. 2.

The integrated error signal on the lead 42 is applied as an input to the control circuit 54 to which the carrier signal is also applied. The carrier signal is applied to a conventional hard limiter 62, through and AND gate 63, to provide the reference signals conventionally required by the synchronous demodulators 55 and 55'. A pulse width modulator 64 provides, in a conventional manner, a train of pulses whose pulse width is proportional to the magnitude of the integrated error signal on the lead 42. Thus when the integrated error signal increases or decreases in magnitude, the width of the pulses provided by the pulse width modulator 64 increases or decreases, respectively, in a corresponding manner. The pulses from the pulse width modulator 64 are provided as an input to the AND gate 63. When a pulse is present, the AND gate 63 transmits the reference signal from the hard limiter 62 to the synchronous demodulators 55 and 55'. Conversely, in the absence of a pulse from the pulse width modulator 64, the AND gate 63 inhibits transmission of the reference signal to the demodulators 55 and 55'. It may thus be appreciated that the demodulators 55 and 55' provide D.C. signals to the respective subtractors 56 and 56' only when the pulses from the pulse width modulator 64 are present. Hence, the respective duty cycles of operation of the synchronous demodulators 55 and 55' are directly proportional to the magnitude of the integrated error signal on the lead 42.

Since the respective gains of the loops 52 and 53 are related to the duty cycle of operation of the synchronous demodulators 55 and 55', respectively, it may now be understood that the gains of the loops 52 and 53 are proportional to the magnitude of the integrated error signal on the lead 42. Thus, when the magnitudes of the sine and cosine signals on the leads 14 and 15, respectively, change because of undesired magnitude variations, the control circuit 54 adjusts the gains of the gain controlling loops 52 and 53 until the error signal on the lead 40, produced by the change in magnitude, is reduced to zero, in a manner similar to that described with respect to FIG. 2.

It should be appreciated that the gain controlling loops 52 and 53 provide the dual functions of individually following up both desired and undesired variations in the magnitudes of the respective sine and cosine signals and of cooperatively changing the gains of the loops to render the repeated angle signals on the leads 21 and 22, respectively, independent of undesired magnitude variations of the sine and cosine signals on the leads 14 and 15, respectively. Thus, it may be appreciated that the control circuit 54 cooperates with the gain controlling loops 52 and 53 to provide an adjusting circuit in accordance with the teachings of the present invention.

It may be appreciated that the embodiment of the repeater 16 described above are readily adaptable, in accordance with the present invention, to a varety of synchro and resolver signals commonly encountered in the servo art. For example, the angle signals on the leads 14 and 15 may be A.C. resolver signals of the form $A \sin \psi_m \sin \omega t$ and $A \cos \psi_m \sin \omega t$, respectively. In this embodiment the multipliers 24, 25 and 26 as well as the carrier signal source 20, may not be required with the signals on the leads 14 and 15 being applied directly to two gain controlled amplifiers 27 and 30. The gain of the amplifiers 27 and 30 may then be controlled by the integrated error signal on the lead 42.

As a further example, it may be appreciated that embodiments of the present invention may be realized for D.C. three-wire synchro signals of the form $A \sin \psi_m$, $A \sin (\psi_m + 120)$ and $A \sin (\psi_m + 240)$ or for A.C. three-wire synchro signals of the form $A \sin (\psi_m \sin \omega t$, $A \sin (\psi_m + 120) \sin \omega t$ and $A \sin (\psi_m + 240) \sin \omega t$. In these embodiments, a combining circuit of the type described in the article entitled "Design of a Constant-Amplitude Variable-Phase Voltage Source" by Abraham Goodman appearing in the March 1961 issue of the Electrical Design News, may be utilized.

While the invention has been described in its preferred embodiment, it is to be understood that the words which have been used are words of description rather than limitation and that changes may be made without departing from the true scope and spirit of the invention in its broader aspects.

We claim:

1. A repeater adapted to be responsive to angle signals of magnitudes representative of respective functions of an angle, said angle signals being subject to undesired magnitude variations comprising:

adjusting means coupled to receive said angle signals for providing repeated angle signals corresponding thereto, combining means responsive to said repeated angle signals for providing a combined signal thereof with magnitude independent of said angle and dependent on said undesired magnitude variations, reference means for providing a reference signal of predetermined magnitude, and feedback means coupled to receive said combined signal and said reference signal for providing an error signal in accordance with the difference therebetween, said adjusting means being responsive to said error signal for adjusting said repeated angle signals in accordance therewith, whereby said repeated angle signals are rendered independent of said undesired magnitude variations.

2. A repeater of the character recited in claim 1 in which said functions comprise trigonometric functions, respectively.

3. A repeater of the character recited in claim 1 in which said angle signals comprise signals representative of the sine and cosine of said angle, respectively.

4. A repeater of the character recited in claim 3 in which said combining means comprises series connected resistor and capacitor means responsive to said repeated angle signals corresponding to said sine and cosine signals said combined signal being provided at the junction therebetween.

5. A repeater of the character recited in claim 1 in which said angle signals comprise D.C. signals, respectively.

6. A repeater of the character recited in claim 5 further including a source of carrier signal and in which said adjusting means includes modulation means for modulating said carrier signal in accordance with said angle signals for providing said repeated angle signals, respectively.

7. A repeater of the character recited in claim 1 in which said feedback means includes integrator means responsive to said error signal for providing an integrated error signal to said adjusting means.

8. A repeater of the character recited in claim 6 in which
said angle signals comprise signals representative of the sine and cosine of said angle, respectively, and
said modulation means comprises first and second multiplier means for multiplying said carrier signal by said sine and cosine signals, respectively, for providing said repeated angle signals corresponding thereto, respectively.

9. A repeater of the character recited in claim 8 in which
said combining means comprises series connected resistor means and capacitor means,
said resistor means being responsive to said repeated angle signal corresponding to one of said sine and cosine signals,
said capacitor means being responsive to said repeated angle signal corresponding to the other of said sine and cosine signals, and
said combined signal being provided at the junction between said resistor means and capacitor means.

10. A repeater adapted to be responsive to D.C. angle signals representative of respective functions of an angle, said angle signals being subject to undesired magnitude variations comprising:
adjusting means responsive to said angle signals for providing repeated angle signals corresponding thereto,
combining means responsive to said repeated angle signals for providing a combined signal thereof with magnitude independent of said angle and dependent on said undesired magnitude variations,
reference means for providing a D.C. reference signal of predetermined magnitude,
feedback means responsive to said combined signal and reference signal for providing an error signal in accordance therewith, said adjusting means being responsive to said error signal for adjusting said repeated angle signals in accordance therewith, whereby said repeated angle signals are rendered independent of said undesired magnitude variations, and
a source of carrier signal,
said adjusting means including modulation means for modulating said carrier signal in accordance with said angle signals for providing said repeated angle signals, respectively,
said angle signals comprising signals representative of the sine and cosine of said angle, respectively,
said modulation means comprising first and second multiplier means for multiplying said carrier signal by said sine and cosine signals, respectively, for providing said repeated angle signals corresponding thereto, respectively,
said combining means comprising series connected resistor means and capacitor means,
said resistor means being responsive to said repeated angle signal corresponding to one of said sine and cosine signals,
said capacitor means being responsive to said repeated angle signal corresponding to the other of said sine and cosine signals,
said combined signal being provided at the junction between said resistor means and capacitor means,
said feedback means comprising rectifier means coupled to said junction between said resistor means and capacitor means for rectifying said combined signal, subtractor means responsive to said rectified combined signal and said reference signal for providing said error signal representative of the difference therebetween and integrator means coupled to said subtractor means for integrating said error signal for providing an integrated error signal to said adjusting means.

11. A repeater of the character recited in claim 10 in which said adjusting means further includes third multiplier means responsive to said integrated error signal and said carrier signal for providing the product therebetween to said first and second multiplier means, thereby providing to said first and second multiplier means said carrier signal adjusted in accordance with said integrated error signal.

12. A repeater of the character recited in claim 11 further including means for biasing said integrator means whereby said integrated error signal is unidirectional.

13. A repeater for use in a magnetic compass system for providing a measure of the angle between the direction of the earth's magnetic field and a reference direction, said system including flux valve means responsive to said magnetic field for providing angle signals of magnitudes representative of respective trigonometric functions of said angle, said angle signals being subject to undesired magnitude variations in accordance with variations in the field strength of said earth's magnetic field; the combination comprising
adjusting means coupled to receive said angle signals for providing repeated angle signals corresponding thereto,
combining means responsive to said repeated angle signals for providing a combined signal thereof with magnitude independent of said angle and dependent on said undesired magnitude variations,
reference means for providing a reference signal of predetermined magnitude, and
feedback means coupled to receive said combined signal and said reference signal for providing an error signal in accordance with the difference therebetween, said adjusting means being responsive to said error signal for adjusting said repeated angle signals in accordance therewith, whereby said repeated angle signals are rendered independent of said variations in said field strength.

14. A repeater of the character recited in claim 13 in which said angle signals comprise signals representative of the sine and cosine of said angle, respectively.

15. A repeater of the character recited in claim 14 in which said combining means comprises series connected resistor and capacitor means responsive to said repeated angle signals corresponding to said sine and cosine signals, said combined signal being provided at the junction therebetween.

16. A repeater of the character recited in claim 13 in which said feedback means includes integrator means responsive to said error signal for providing an integrated error signal to said adjusting means.

17. A repeater of the character recited in claim 13 further including coupler means coupled between said flux valve means and said adjusting means for providing D.C. signals in accordance with said angle signals.

18. A repeater of the character recited in claim 17 further including a source of carrier signal and in which said adjusting means comprises modulation means for modulating said carrier signal in accordance with said D.C. signals for providing said repeated angle signals, respectively.

19. A repeater of the character recited in claim 18 in which
said D.C. signals comprise signals representative of the sine and cosine of said angle, respectively, and
said modulation means comprises first and second multiplier means for multiplying said carrier signal by said sine and cosine signals, respectively, for providing said repeated angle signals corresponding thereto, respectively.

20. A repeater of the character recited in claim 19 in which said combining means comprises series connected resistor means and capacitor means, said resistor means being responsive to said repeated angle signal corresponding to one of said sine and cosine signals, said capacitor means being responsive to said repeated angle signal corresponding to the other of said sine and cosine signals, and said combined signal being provided at the junction between said resistor means and capacitor means.

21. A repeater of the character recited in claim 20 in which said reference signal comprises a D.C. signal and said feedback means comprises rectifier means coupled to said junction between said resistor means and capacitor means for rectifying said combined signal, subtractor means responsive to said rectified combined signal and said reference signal for providing said error signal representative of the difference therebetween, and integrator means coupled to said subtractor means for integrating said error signal for providing an integrated error signal to said adjusting means.

22. A repeater of the character recited in claim 21 in which said adjusting means further includes third multiplier means responsive to said integrated error signal and said carrier signal for providing the product therebetween to said first and second multiplier means, thereby providing to said first and second multiplier means said carrier signal adjusted in accordance with said integrated error signal.

23. A repeater of the character recited in claim 22 further including means for biasing said integrator means whereby said integrated error signal is unidirectional.

24. A repeater adapted to be responsive to angle signals representative of respective functions of an angle, said angle signals being subject to undesired magnitude variations comprising:

adjusting means responsive to said angle signals for providing repeated angle signals corresponding thereto, combining means responsive to said repeated angle signals for providing a combined signal thereof with magnitude independent of said angle and dependent on said undesired magnitude variations, reference means for providing a reference signal of predetermined magnitude, and feedback means responsive to said combined signal and reference signal for providing an error signal in accordance therewith, said adjusting means being responsive to said error signal for adjusting said repeated angle signals in accordance therewith, whereby said repeated angle signals are rendered independent of said undesired magnitude variations, said adjusting means further including gain controlling means for controlling the magnitude of said repeated angle signals with respect to said corresponding angle signals, respectively, said adjusting means being responsive to said error signal for controlling the gain of said gain controlling means in accordance therewith.

25. A repeater of the character recited in claim 24 in which said angle signals comprise D.C. signals representative of the sine and cosine of said angle, respectively.

26. A repeater of the character recited in claim 25 further including a source of carrier signal and in which said gain controlling means comprises first and second gain controlling loops comprising respectively first demodulator means responsive to said repeated angle signal corresponding to said sine signal for providing a first demodulated signal, first substractor means responsive to said sine signal and first demodulated signal for providing a first difference signal representative of the difference therebetween, first integrator means responsive to said first difference signal for providing an integrated first difference signal and first modulator means responsive to said integrated first difference signal and said carrier signal for modulating said carrier signal in accordance with said integrated first difference signal for providing said repeated angle signal corresponding to said sine signal, and second demodulator means responsive to said repeated angle signal corresponding to said cosine signal for providing a second demodulated signal, second subtractor means responsive to said cosine signal and said second demodulated signal for providing a second difference signal representative of the difference therebetween, second integrator means responsive to said second difference signal for providing an integrated second difference signal and second modulator means responsive to said integrated second difference signal and said carrier signal for modulating said carrier signal in accordance with said integrated second difference signal for providing said repeated angle signal corresponding to said cosine signal.

27. A repeater of the character recited in claim 26 in which said first and second modulator means comprise first and second multiplier means, respectively, for multiplying said carrier signal by said first and second integrated difference signals, respectively, for providing said repeated angle signals corresponding to said sine and cosine signals, respectively.

28. A repeater of the character recited in claim 27 in which said combining means comprises series connected resistor means and capacitor means, said resistor means being responsive to said repeated angle signal corresponding to one of said sine and cosine signals, said capacitor means being responsive to said repeated angle signal corresponding to the other of said sine and cosine signals, and said combined signal being provided at the junction between said resistor means and capacitor means.

29. A repeater of the character recited in claim 28 in which said reference signal comprises a D.C. signal and said feedback means comprises rectifier means coupled to said junction between said resistor means and capacitor means for rectifying said combined signal, third subtractor means responsive to said rectified combined signal and said reference signal for providing said error signal representative of the difference therebetween, and third integrator means coupled to said third substractor means for integrating said error signal for providing an integrated error signal to said adjusting means.

30. A repeater of the character receited in claim 29 in which said first and second demodulator means comprise first and second synchronous demodulators, respectively.

31. A repeater of the character recited in claim 30 in which said adjusting means further includes control means responsive to said integrated error signal for controlling the operation of said first and second synchronous demodulators in accordance therewith, for controlling the gains of said first and second gain controlling loops, respectively.

32. A repeater of the character recited in claim 31 in which said control means comprises, pulse width modulator means responsive to said integrated error signal for providing pulses having pulse widths in accordance therewith, means responsive to said carrier signal for providing reference signals for said synchronous demodulators, and AND gate means responsive to said reference signals and said pulse signals for transmitting said reference signals to said synchronous demodulators when said pulses are present and for inhibiting transmission of said reference signals to said synchronous demodulators when said pulses are absent.

33. A repeater of the character recited in claim 32 in which said means responsive to said carrier signal comprises a hard limiter for providing a rectangular wave signal at the frequency of, and in-phase with, said carrier signal.

References Cited

UNITED STATES PATENTS

| | | | |
|---|---|---|---|
| 3,482,086 | 12/1969 | Caswell | 235—186 |
| 3,028,504 | 4/1962 | Close | 235—186 X |
| 3,068,467 | 12/1962 | Grimaila | 235—189 UX |
| 3,187,169 | 6/1965 | Trammel, Jr., et al. | 235—189 |
| 3,504,361 | 3/1907 | Catton | 235—186 X |

JOSEPH F. RUGGIERO, Jr., Primary Examiner

U.S. Cl. X.R.

33—204 FA; 235—189; 318—647